United States Patent
Vu et al.

[11] Patent Number: 5,470,036
[45] Date of Patent: Nov. 28, 1995

[54] WRIST/HAND SUPPORT FOR KEYBOARDS

[76] Inventors: Huy D. Vu, 1059 Sandalwood La., Milpitas, Calif. 95035; Hoa M. Tran, 2810A Monterey Rd., San Jose, Calif. 95111

[21] Appl. No.: 222,823

[22] Filed: Apr. 5, 1994

[51] Int. Cl.⁶ .................................................. B43L 15/00
[52] U.S. Cl. .................... 248/118.5; 248/205.2; 248/918
[58] Field of Search .................. 248/118, 118.1, 248/118.3, 118.5, 205.2, 918; 400/715

[56] References Cited

U.S. PATENT DOCUMENTS

| | | | |
|---|---|---|---|
| 879,353 | 2/1908 | Asper | 248/118.5 |
| 4,784,120 | 11/1988 | Thomas | 248/118 X |
| 4,915,331 | 4/1990 | Becker et al. | 248/118 |
| 4,973,176 | 11/1990 | Dietrich | 248/118 X |
| 4,982,921 | 1/1991 | Sanders | 248/118 |
| 5,149,033 | 9/1992 | Burzler | 248/118 X |
| 5,161,760 | 11/1992 | Terbrack | 248/118 |
| 5,170,971 | 12/1992 | Schaeffer et al. | 248/118.1 |
| 5,193,771 | 3/1993 | Hassel et al. | 248/118.1 X |
| 5,197,699 | 3/1993 | Smith et al. | 248/118 |
| 5,228,655 | 7/1993 | Garcia et al. | 248/118 |
| 5,340,067 | 8/1994 | Martin et al. | 248/118.5 |
| 5,342,005 | 8/1994 | Szmonda et al. | 248/118 |

*Primary Examiner*—Alvin C. Chin-Shue
*Assistant Examiner*—Korie H. Chan

[57] ABSTRACT

A wrist and hand support device for a user of a keyboard. The device includes a wrist support block and two hand support elements. The hand support elements are mounted on pads movably attached to the base. The hand support elements are mounted so as to be able to roll back and forth depending on the movement of a user's hands.

6 Claims, 3 Drawing Sheets

WRIST/HAND SUPPORT FOR KEYBOARDS

FIELD OF THE INVENTION

The present invention relates generally to ergonomic office equipment, and more specifically is a support device for the wrists and hands of keyboard operators.

BACKGROUND OF THE INVENTION

One of the most common injuries in the workplace is repetitive stress injury (RSI). According to the Bureau of Labor Statistics, RSI is the category of work-based injury that is growing the fastest. RSI is caused by repetitive hand motions. One common situation leading to RSI is that in which the wrist is flexed upward, such as is common in data entry and typing.

Due to the significance and rapid growth of this problem in today's computer based workplace, there are many ergonomic products available on the market to remedy RSI's, e.g., wrist rests and wrist braces. There are also several patents in the prior art which is directed to this problem.

One such device is the "WRIST SUPPORT DEVICE FOR KEYBOARDS", U.S. Pat. No. 5,203,527, issued Apr. 20, 1993. This patent discloses a support which is secured under a keyboard. The device is immobile after installation. A similar device offering a support area with more padding for the greater comfort of the user is the "WRIST REST SUPPORT FOR A COMPUTER USER", U.S. Pat. No. 5,228,655, of Garcia et al.

Another type of device in the prior art makes provision for the movement of the user's hands The "FREE SLIDING HAND REST" of Walter Dandy, III, et al., U.S. Pat. No. 5,108,057, discloses a device with two support pads which slide transversely on two parallel rails which are positioned in front of the keyboard. The "KEYBOARD ACCESSORY" of Clifford Gross, U.S. Pat. No. 5,158,256, features two independent support pads which move along a track secured to the keyboard. It allows the support pads to pivot to accommodate rotation of the user's hands in addition to the lateral movement.

One of the common problems in the prior art is that many of the devices do not allow sufficient movement by the user, limiting his reach around the keyboard, and thereby creating a condition more conducive to RSI. Most current wrist rests are designed only for the wrist at rest, and do not provide sufficient support for the user while he is typing.

Another shortcoming found in some of the devices in the prior art is that they may force the user's hands into precisely a position that is most likely to lead to RSI. This is generally true only for brace devices.

Another problem with some of the prior art devices is that they do not provide sufficient cushion, and can thus chafe the user's wrists and hands.

A still further problem is that many of the prior art device are fairly complex mechanically, thereby being expensive to manufacture and difficult to install and/or store.

OBJECTS, SUMMARY, AND ADVANTAGES OF THE INVENTION

Accordingly it is an object of the present invention to provide a device that has a movable hand support that rolls forward and backward with a person's palm motion to prevent repetitive flexing and extension of the wrist and hand during the use of the keyboard.

It is a further object of the present invention to provide a means to massage a user's palm while he is using the keyboard, thus reducing stress, preventing fatigue, and improving blood circulation.

A still further object of the present invention is to provide a device that conforms to the natural shape of the palm of a user so as to distribute pressure equally across the hand and fingers. This allows the use's hands to maintain a natural, more relaxed and less stressful position.

It is yet another object of the present invention to provide a device which will urge the user's hands to the proper orientation for his protection from injury, and also the proper position relative to the keys on the keyboard.

It is another object of the present invention to provide a device that is adjustable and allows sufficient range of motion so that the user can reach all keys.

In summary, the present invention is a wrist and hand support device for a user of a keyboard. The device includes two hand support elements and an optional wrist support block. The hand support elements are mounted on pads movably attached to the base. The hand support elements are mounted so as to be able to roll back and forth depending on the movement of a user's hands.

An advantage of the present invention is that it provides a very cushioned, supportive device for the user's wrists and hands.

A further advantage of the present invention is that it very simple and inexpensive to manufacture.

A still further advantage of the present invention is that it supports the user's hands and wrists while enabling him to reach all areas of the keyboard.

These and other objects and advantages of the present invention will become apparent to those skilled in the art in view of the description of the best presently known mode of carrying out the invention as described herein and as illustrated in the drawings.

BEST MODE OF CARRYING OUT THE INVENTION

Figure 1:
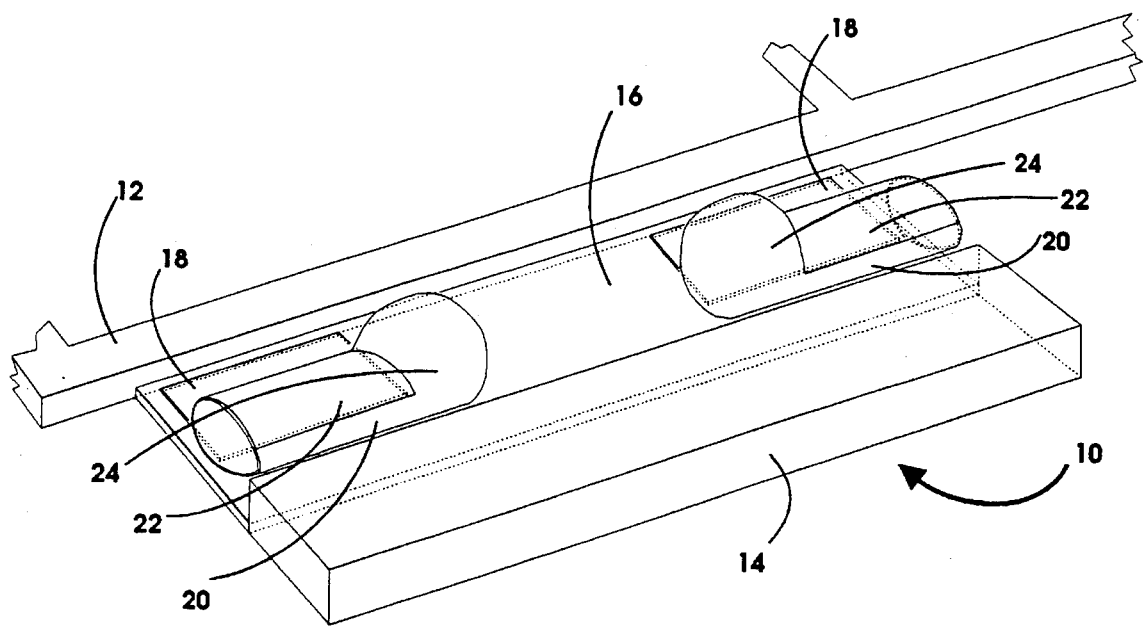
FIG. 1 is a perspective view of the wrist/hand support of the present invention.
Figure 2:
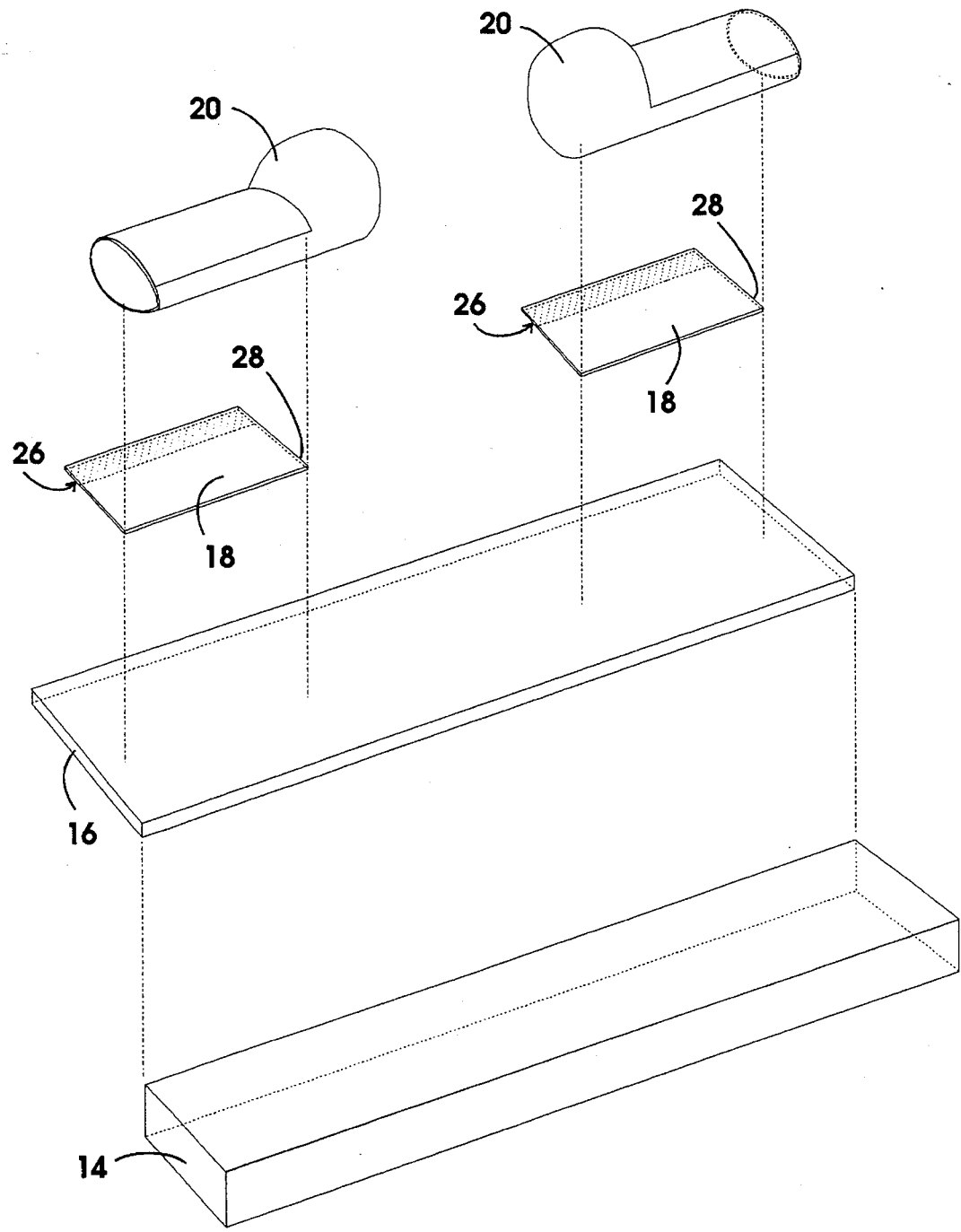
FIG. 2 is an exploded perspective view showing the means of construction of the present invention.

Referring chiefly to FIGS. 1 and 2, the present invention is a wrist/hand support 10 designed to be used in conjunction with a keyboard 12. The support 10 comprises a wrist support block 14, a base 16, mounting pads 18, and hand support elements 20.

The wrist support block 14 and the base 16 each have a bottom surface with a high coefficient of friction so that the device does not slip on a work surface. It is envisioned that the wrist support block 14 will be a rectangular block made form a visco-elastic, self-molding foam. The block will be at least one inch in height to place the user's hands at the optimal position.

The base 16 will generally be made from foam rubber material, and will be approximately ¼ inch thick. If a different material is used for the block 14 and the base 16, a gripping layer may be added to their bottom surfaces if required to achieve sufficient friction.

The wrist support block 14 may be attached at the bottom of its rear edge to the front edge of the base 16. Each of these elements may be used individually, or in conjunction with each other.

Two mounting pads 18 are removably attached to the base 16. In the preferred embodiment, the pads 18 are secured to the base 16 by a fastening means of the hook-and-eye variety, such as Velcro. The female eye portion of the fastening means would form a portion of the lower surface of the pad 18, while the upper surface of the base 16 would include the male hook portion of the fastening means. This arrangement can of course be easily reversed. As will be discussed below, it is important that only a portion of the lower surface of the pad 18 be covered with the fastening means.

Hand support elements 20 are affixed to the upper surface of the pads 18. The hand support elements 20 include a cylindrical support element 22, and a more nearly spherical support element 24 for the fleshy part of the palm directly beneath the user's thumb. The cylindrical support 22 and the spherical support 24 are integral to each other. The hand supports 20 are constructed to conform to the natural contour of a user's hands.

While many materials may be used for the hand support elements, it is envisioned that visco-elastic, self-molding foam rubber will be the most desirable. It is most desirable to have the hand support elements constructed of a soft, pliable material. If a visco-elastic, self-molding material is used, the support will mold to a shape that conforms exactly to the user's hands.

One of the unique aspects of the present invention is that the support elements 20 can move according to the user's wants and wishes. The pads 18 are removably attached to the base 16 so that the user can position the hand supports 20 for his maximum comfort. This reduces the need of the user to flex his wrist, one of the exacerbating factors for RSI.

In addition, the pads 18 have the fastening means attached to only a rear portion of their lower surfaces 26 as shown in FIG. 2. This method of attachment provides a means of allowing the hand supports 20 to roll forward when the user is reaching for keys toward the top of the keyboard.

Figure 3:
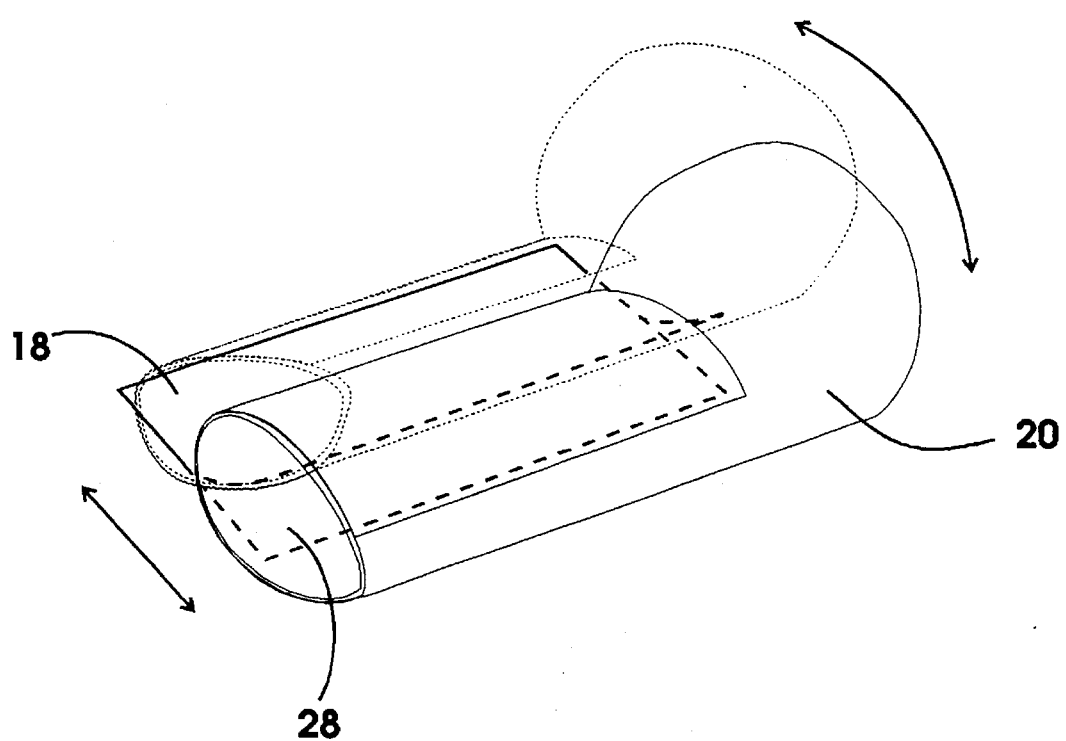
FIG. 3 is a detail view showing the hand support element.

When the user's hands are in their initial position, the hand supports 20 are in the position shown in FIG. 3 as solid lining. As the user reaches for distant keys, the hand supports 20 roll toward the keyboard 12 so that the support of the user's hands is maintained. The front portion 28 of the pad 18, that area not covered by the fastening means 26, is raised from the base 16. The position of the supports 20 after the user has reached for a distant key, and the supports 20 have rolled forward, is shown in phantom in FIG. 3. When the user returns his hands to a non-extended position, the front portion 28 of the pad 18 will return to contact with the base 16, and the hand supports 20 will be in their original positions.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

We claim:

1. A support device for a keyboard operator comprising:

a base adapted to be placed on a work surface; mounting pads removably attached to the base;

hand support elements shaped to conform to the contour of a human hand, the hand support elements being removably attached via the mounting pads to the base of said support device, the lower surface of the base having a high friction coefficient so as to avoid slippage on the work surface, the attachment of the mounting pads to the base being accomplished by fastening means such that the keyboard operator is able to alter the position of the mounting pads on the base by simply lifting the mounting pad off of the base, and repositioning the pad at a desired position, said fastening means for the mounting pads is also constructed so that a front portion of the pad is permitted to freely lift off of the base while other portions of the pad remain attached to the base, allowing the hand support to roll forward as the keyboard operator reaches for distant keys on a keyboard.

2. The support device of claim 1 wherein:

the hand support elements are formed from a visco-elastic, self-molding material, so that after usage they shape themselves to exactly conform to the contour of the keyboard operator's hands.

3. A support device for a keyboard operator comprising:

a base adapted on a work surface; mounting pads removably attached to the base;

a wrist support element, the lower surface of which has a high friction coefficient so as to avoid slippage on the work surface;

hand support elements shaped to conform to the contour of a human hand, the hand support elements being removably attached via the mounting pads to the base of said support device, the lower surface of which also has a high friction coefficient so as to avoid slippage; wherein the base of the support device and the wrist support element are fixed to each other in a proper orientation to conform to a human user's anatomy, the attachment of the mounting pads to the base being accomplished by fastening means such that the keyboard operator is able to alter the position of the mounting pads on the base by simply lifting the mounting pad off of the base, and repositioning the pad at desired position, said fastening means for the mounting pads is also constructed so that a front portion of the pad is permitted to freely lift off of the base while other portions of the pad remain attached to the base, allowing the hand support to roll forward as the keyboard operator reaches the distant keys on a keyboard.

4. The support device of claim 3 wherein:

a base adapted to be placed on a work surface; mounting pads removably attached to the base;

the hand support elements are formed from a visco-elastic self-molding material that provides cushioning for the keyboard operator's hands and the following use, allows the hand support elements to shape themselves to exactly conform to the contour of the keyboard operator's hands.

5. A support device for a keyboard operator comprising:

a base adapted to be placed on a work surface; mounting pads removably attached to the base;

a wrist support element, the lower surface of which has a high friction coefficient so as to avoid slippage on the work surface;

hand support elements shaped to conforming to the contour of a human hand, the hand support elements being attached to the base of said support device, the lower surface of which also has a high friction coefficient so as to avoid slippage on the work surface; wherein the base of the support device and the wrist support element are fixed to each other in a proper orientation to conform to a human user's anatomy; and wherein the support elements are formed from a material that provides cushioning for a user's hands, with the hand support elements being mounted on the mounting pads which are removably attached to the base, so as to allow the user to position the hand support elements as the user desires, a means for attaching the mounting pads to the base is constructed so that a front portion of the pad is permitted to freely lift off of the base while other portions of the pad remain attached to the base, allowing the hand support to roll forward as a user reaches the distant keys on a keyboard, the attaching means being such that the user is able to also alter the position of the mounting pad on the base by simply lifting the mounting pad off of the base, and repositioning the pad at a desired position.

6. The wrist and hand support device of claim 5 wherein:

the hand support elements are formed from a visco-elastic, self-molding material that provides cushioning for the user's hands and following use, allows the hand support elements to shape themselves to exactly conform to the contour of the user's hands.

* * * * *